United States Patent [19]
Scott

[11] 3,926,322
[45] Dec. 16, 1975

[54] APPARATUS FOR REMOVING CONTAINERS FROM PACKAGES

[75] Inventor: Billy Joe Scott, Etiwanda, Calif.

[73] Assignee: Stewart/Walker Company, LaPalma, Calif.

[22] Filed: July 29, 1974

[21] Appl. No.: 492,882

[52] U.S. Cl. ............... 214/305; 53/381 R; 206/526; 221/31
[51] Int. Cl.² ........................................ B65G 65/04
[58] Field of Search ........... 214/304, 305, 309, 310, 214/8.5 F, 1 BB; 206/526; 53/381 R; 30/2, 3; 221/31

[56] References Cited
UNITED STATES PATENTS

| | | | |
|---|---|---|---|
| 3,107,817 | 10/1963 | Hoglund | 221/31 |
| 3,616,951 | 11/1971 | St. Clari et al. | 214/310 |
| 3,777,913 | 12/1973 | Schieser et al. | 214/8.5 D |

*Primary Examiner*—Robert J. Spar
*Assistant Examiner*—Lawrence J. Oresky
*Attorney, Agent, or Firm*—Harris, Kern, Wallen & Tinsley

[57] ABSTRACT

A method and apparatus for opening and emptying a package having two layers of goods in which the package is cut into two halves, unfolded, then the goods are pushed out of a side of the package which has been cut by a plurality of knives. The package is held against movement when the goods are pushed out of the package.

6 Claims, 8 Drawing Figures

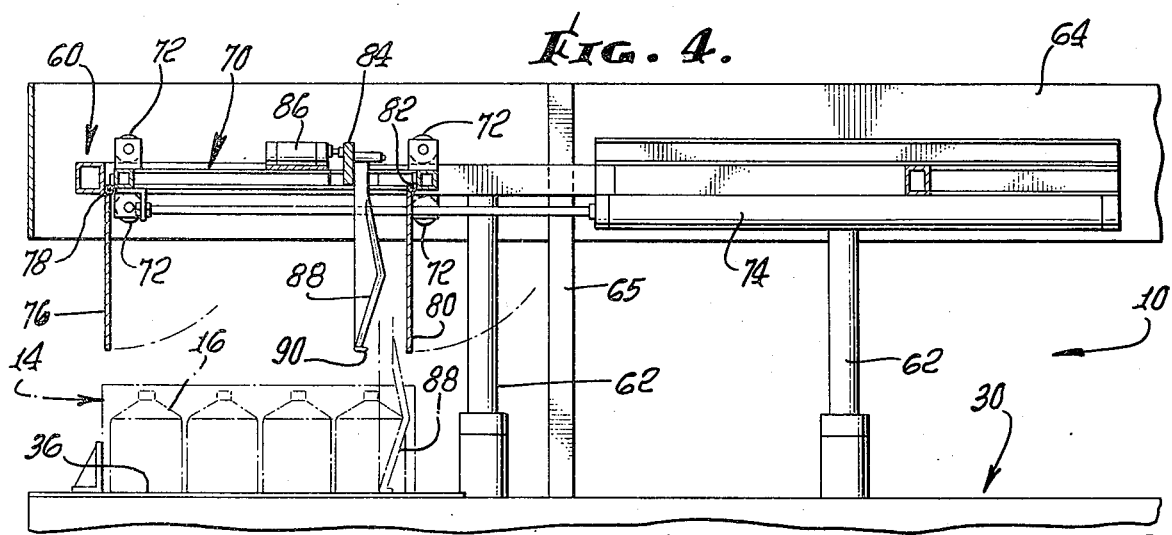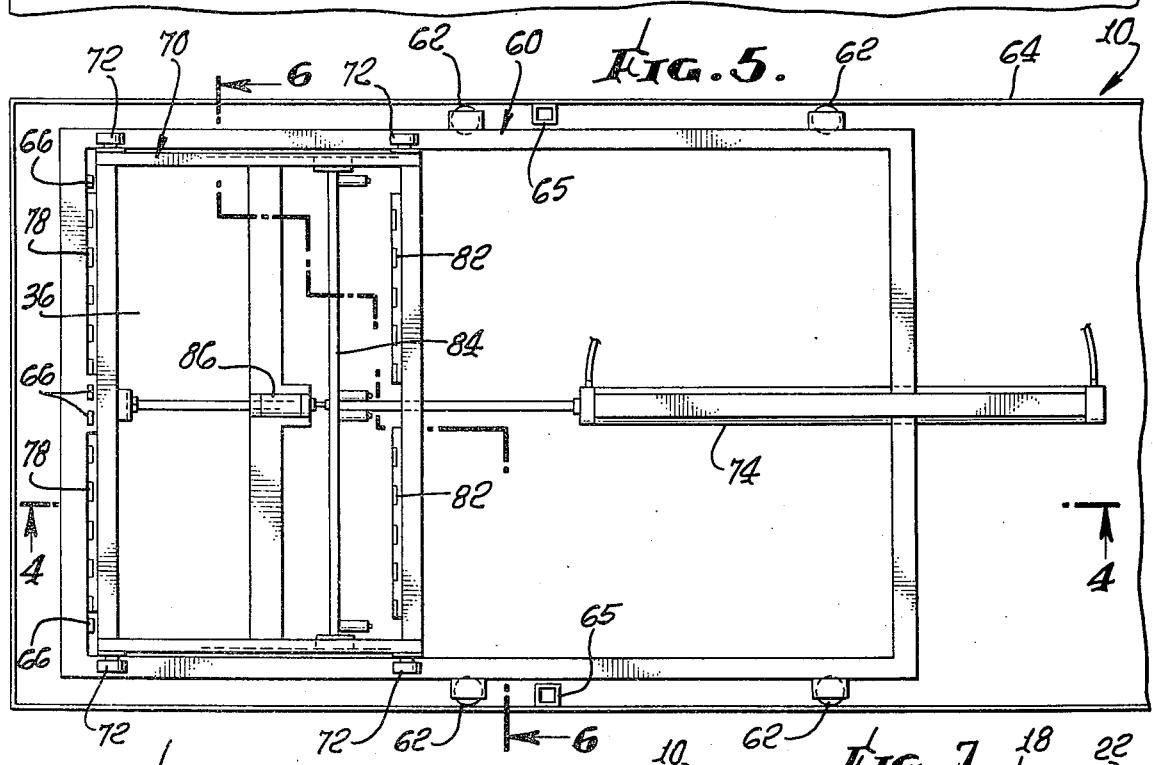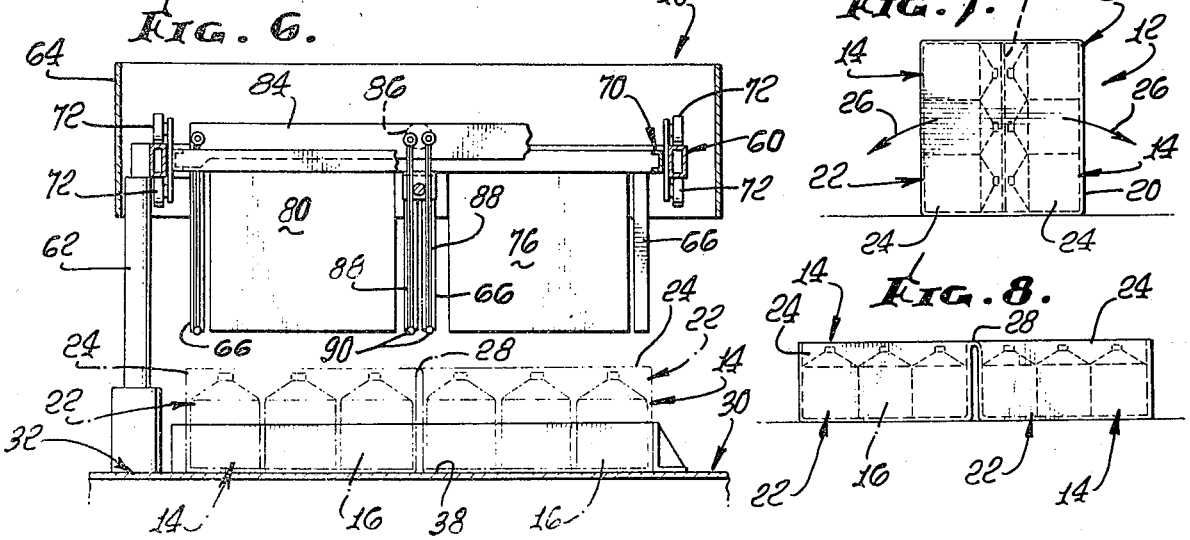

APPARATUS FOR REMOVING CONTAINERS FROM PACKAGES

BACKGROUND OF INVENTION

The present invention relates in general to a method and apparatus for removing articles from a package and delivering them to a conveyor system in a predetermined pattern, i.e., a rank and file pattern, single file, or the like.

More particularly, the invention relates to a container package and to a method and apparatus for removing the containers from the package in a rank and file arrangement which is then broken down into a single file pattern. The containers may, for example, be empty containers which are to be delivered single file to a machine for filling them with a desired commodity, such as milk. For convenience in disclosing the invention, it will be considered in an environment of this nature herein. However, it will be understood that the invention may be embodied in apparatuses and methods for unpackaging other articles and breaking them down into rank and file and/or single file patterns.

SUMMARY AND OBJECTS OF INVENTION

A primary object of the invention is to provide the package of containers each having an open end and a closed end with the package including two layers of containers so arranged that the open ends of the containers in one of the layers face the open ends of the containers in the other of the layers, the package further including an envelope enclosing the two layers of containers to retain them in the relationship set forth.

The invention may be further summarized as including, and another object is to provide a method and apparatus which comprise: cutting the envelope mentioned along three sides thereof in a plane between the open ends of the containers of the two layers to divide the package into two halves; subsequently displacing the two halves of the package outwardly and downwardly away from each other so that the containers of the two layers are upright with the fourth side of the envelope acting as a hinge interconnecting the two halves of the package; then further cutting a forward side of the original envelope adjacent the ends of such side and adjacent and on opposite sides of the hinge mentioned; and, finally, displacing the two layers of containers forwardly out of the envelope through the forward side thereof while restraining the envelope against forward displacement.

Another object is to provide a container unpackaging apparatus and method of the foregoing nature wherein the containers in the two layers or groups are arranged in parallel rows and wherein successive ones of the rows of containers are displaced at right angles to the direction of forward displacement out of the envelope to form a single file of containers composed of successive ones of the rows mentioned.

Another object is to provide an apparatus of the foregoing nature including cutting means for cutting the two portions or halves of the envelope open on a forward side of the envelope in four cutting zones respectively adjacent the corners of such side and adjacent and on opposite sides of the hinge interconnecting the two package halves, such cutting means comprising four depending knives and means for moving the knives downwardly into the envelope portions and forwardly into the four cutting zones, respectively.

Yet another object is to provide an apparatus which includes: a main carriage movable in the fore-and-aft direction and carrying the container displacing means; an auxiliary carriage movable relative to the main carriage in the fore-and-aft direction and carrying the knives; and means for lowering the main carriage to lower the container displacing means and the knives into the two envelope portions.

A further object is to provide an apparatus of the foregoing nature wherein the main carriage is mounted on a vertically movable frame carrying the envelope restraining means, whereby the envelope restraining means, the container displacing means and the knives are all simultaneously lowered into the envelope portions upon lowering of such frame.

An additional object is to provide an apparatus as hereinbefore set forth wherein the main carriage also carries means lowerable into the envelope portions for forwardly displacing the forward side of the envelope out of the path of the groups of containers as they are forwardly displaced from the envelope portions.

The foregoing objects, advantages, features and results of the present invention, together with various other objects, advantages, features and results thereof which will be evident to those skilled in the container unpackaging art in the light of this disclosure, may be achieved with the exemplary embodiments of the invention illustrated in the accompanying drawings and described in detail hereinafter.

DESCRIPTION OF DRAWINGS

FIG. 4 is a fragmentary sectional view taken as indicated by the arrowed line 4—4 of FIG. 5;

FIG. 5 is a plan view of the portion of the apparatus which is shown in section in FIG. 4;

FIG. 6 is a sectional view taken as indicated by the irregular arrowed line 6—6 of FIG. 5;

FIG. 7 is a side elevational view on a reduced scale of a container package embodying the invention; and FIG. 8 is a side elevational view of the container package after cutting the envelope thereof along three sides and then displacing the two halves of the package outwardly and downwardly away from each other into horizontal positions with the fourth side of the envelope acting as a hinge interconnecting the two halves of the package.

DETAILED DESCRIPTION OF INVENTION

Figure 1:
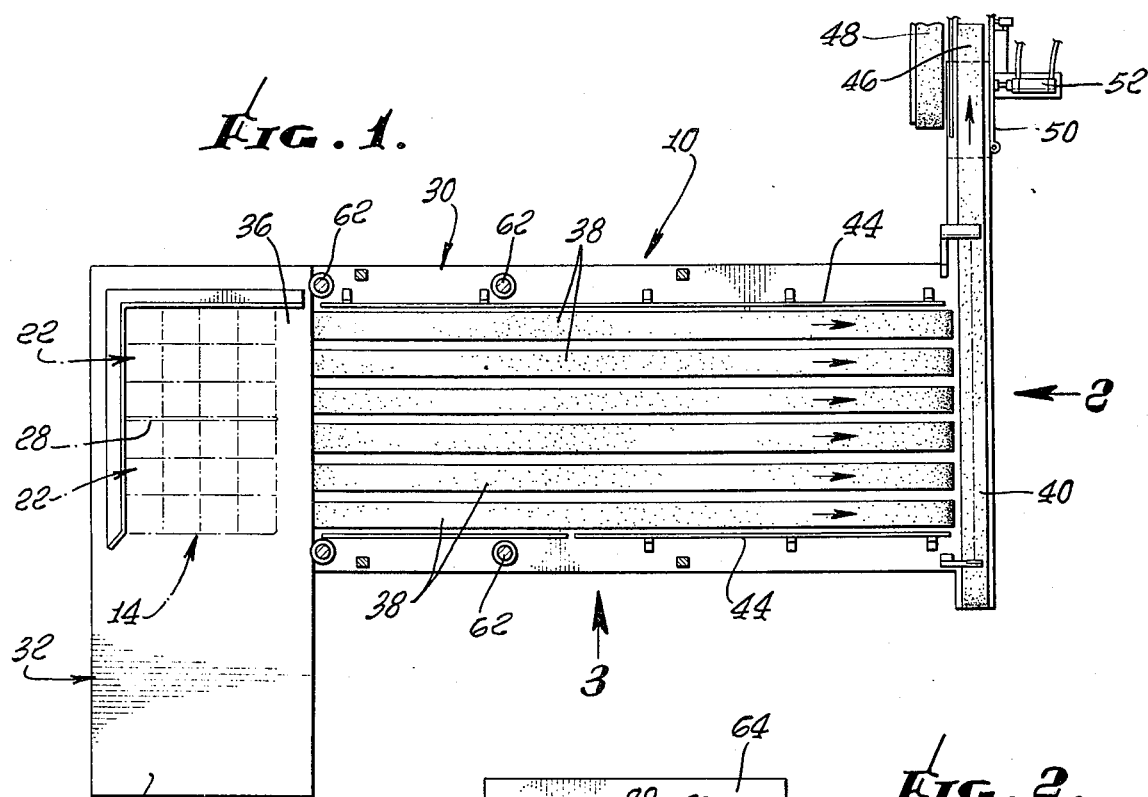
FIG. 1 is a plan view of a container unpackaging apparatus of the invention with overhead parts removed for clarity.
Figure 2:
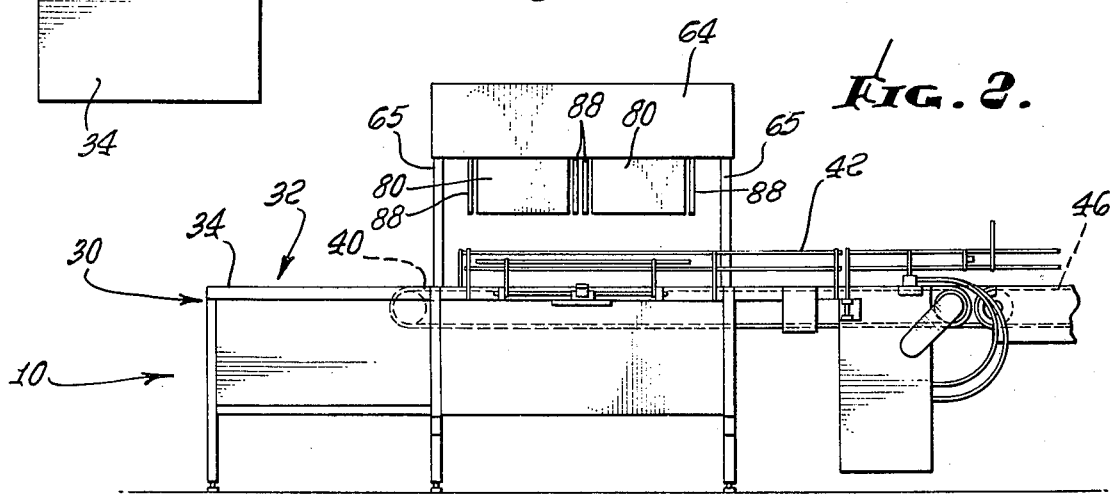
FIG. 2 is an end elevational view of the apparatus taken as indicated by the arrow 2 of FIG. 1.
Figure 3:
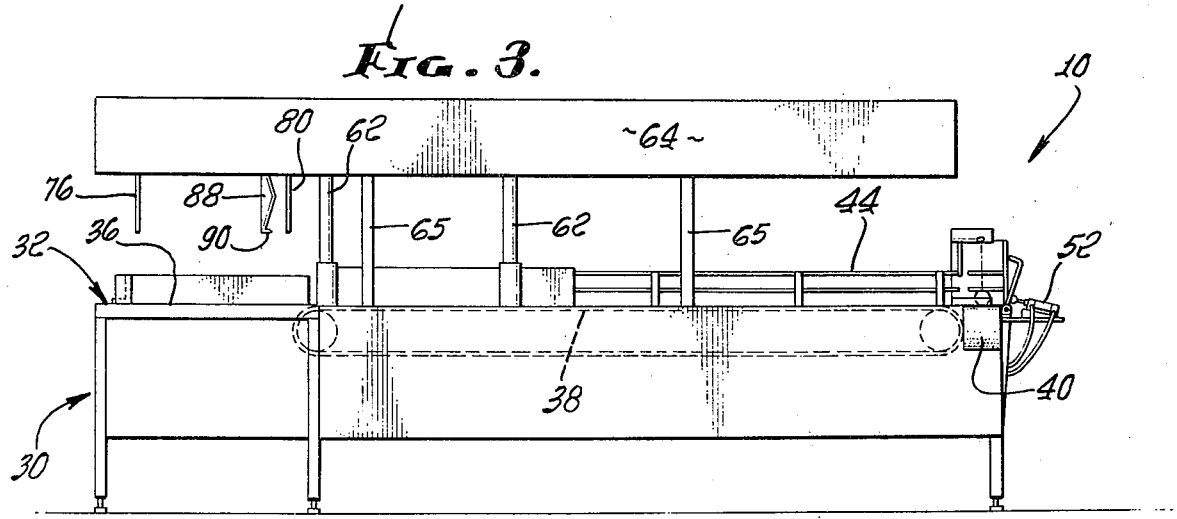
FIG. 3 is a side elevational view of the apparatus taken as indicated by the arrow 3 of FIG. 1.

The container unpackaging apparatus of the invention is designated generally throughout the drawings by the numeral 10 and is specifically designed to unpackage containers from the container package 12 shown in FIG. 7 of the drawings.

The container package 12 comprises two layers or groups 14 of containers 16 having open ends and closed ends, the open ends of the containers 16 of one of the layers 14 facing the open ends of the containers in the other, as will be clear from FIG. 7. The open ends of the containers in the two layers 14 have a separator 18 therebetween.

The two container layers 14 and the separator 18 are enclosed by an envelope 20 which may be formed of any suitable material, although paper, and particularly kraft paper, is presently preferred.

As the initial step in opening the container package 12, it is manually cut open along three sides thereof in the plane of the separator 18, i.e., in a plane between the open ends of the containers of the two layers 14, to divide the package into two halves 22. Each half 22 comprises an envelope portion 24 containing one of the container layers 14. The two halves 22 of the container package 12 are then displaced outwardly and downwardly away from each other, as indicated by the arrows 26 in FIG. 7, so that the containers 16 of the two layers 14 are upright, with the fourth side of the original envelope 20 acting as a hinge 28 interconnecting the two package halves. This condition is shown in FIG. 8 of the drawings, and also in FIG. 6 thereof.

Each container layer 14 may comprise any desired number of rows of containers. In the particular construction illustrated, each container layer 14 comprises four rows of three containers each. When the package is in the partially opened position of FIG. 8, there are thus four rows of six containers each.

The unpackaging apparatus 10 comprises a base 30 which includes a table 32 having an area 34 wherein the foregoing manual cutting operation is carried out, and an area 36 wherein the final unpackaging operation takes place. After the manual cutting operation hereinbefore described in connection with FIGS. 7 and 8 has been completed, the two package halves 22 are manually pushed onto the area 36 of the table 32, as suggested schematically in FIG. 1 of the drawings.

The base 30 of the unpackaging apparatus 10 also includes belt conveyors 38 corresponding in number to the number of containers 16 in each row in the two package halves 22. Thus, in the particular construction illustrated, there are six of the belt conveyors 38. As will be described hereinafter, the containers 16 in successive rows in the two envelope portions 24 are pushed onto the respective belt conveyors 38. The latter convey successive rows to a transverse conveyor 40, FIG. 1, which conveys successive rows from the envelope portions 24 laterally in single file. A "fence" 42 at the ends of the conveyors 38 and paralleling the conveyor 40 limits the movement of the container rows in the direction of travel of the conveyor belts 38. "Fences" 44 paralleling the array of belt conveyors 38 on opposite sides thereof control the successive rows of containers emanating from the envelope portions 24 as they move toward the cross conveyor 40.

The single file of containers 16 on the transverse container 40 is delivered to either of two outlet containers 46 and 48, depending on the position of a shunt 50 which is actuated in any suitable manner, as by a cylinder 52.

Turning now to a consideration of the manner in which the two layers 14 of containers 16 are removed from the envelope portions 24 interconnected by the hinge 28, the unpackaging apparatus 10 is provided with an overhead frame 60 which is connected to the base 30 by vertical rams 62 and which is movable upwardly and downwardly relative to the base 30 by such rams. In the particular construction illustrated, the overhead frame 60 is simply an open rectangle. The overhead frame 60 may be enclosed by a rectangular shield 64 for protective purposes. This shield is carried by posts 65.

Rigidly connected to the overhead frame 60 adjacent the left end thereof, as viewed in FIG. 5, are four depending fingers 66. These fingers 66 are lowered into the envelope portions 24 adjacent the rearward side thereof, i.e., adjacent the rearward side of the original envelope. Two of the depending fingers 66 are disposed on opposite sides of the hinge 28 interconnecting the two package halves 22, while the other two fingers 66 are inserted into the envelope portions 24 adjacent the outer ends of the rearward side thereof. As will become apparent, these depending fingers 66 serve to restrain the envelope portions 24 against forward movement when the rows of containers 16 are displaced forwardly out of the envelope portions 24 onto the belt conveyors 38.

A main carriage 70 is mounted on and movable longitudinally of the overhead frame 60, i.e., is movable relative to the overhead frame in the fore and aft direction. The main carriage 70 is supported on the overhead frame 60 by wheels 72 engageable with opposite sides of the frame. The main carriage 70, which is located generally above the table area 36, is displaced longitudinally by a ram 74 mounted on the overhead frame 60.

Depending from the rearward end of the main carriage 70 are two plates 76 which are insertable into the respective envelope portions 24 adjacent the rearward side of the original envelope 20, i.e., between the rearward side of such envelope and the rearward row of containers 16. This relationship will be clear from FIG. 4 of the drawings. The plates 76 are hinged on their upper edges by hinges 78, which hinges permit counterclockwise pivoting of the plates 76 during rearward movement of the main carriage 70 if such pivoting is necessary because of obstructions encountered on the table area 36. However, the container pushing plates 76 cannot pivot rearwardly beyond vertical positions, shown in FIG. 4 of the drawings. When in their vertical positions, the container pushing plates 76 are aligned with the envelope restraining fingers 66, as shown in FIG. 5.

Adjacent the forward end of the main carriage 70 are similar hinged depending plates 80 which are hinged at 82 and which are insertable between the front row of containers 16 in the respective envelope portions 24 and the front side of the original envelope 20. The purpose of these plates is to push the front side of the envelope 20 forwardly and downwardly out of the way of the rows of containers 16 as they are pushed forwardly onto the conveyor belts 38, row by row, by the container pushing plates 76. The envelope pushing plates 80 cannot pivot rearwardly beyond vertical positions, in the same way as the container pushing plates 76.

Mounted for longitudinal, i.e., fore-and-aft, movement on the main carriage 70 is an auxiliary carriage 84 actuable by a ram 86. Depending from the auxiliary carriage 84 are four knives 88 respectively adapted to cut the forward side of the original envelope 20 in four cutting zones. Two of these cutting zones are disposed adjacent and on opposite sides of the hinge 28, while the other two are adjacent the outer corners of the forward side of the original envelope.

As will be apparent, when the overhead frame 60 is lowered to lower the container pushing plates 76 and the envelope pushing plates 80 into the envelope portions 24, the knives 88 are simultaneously lowered into the envelope portions. By actuating the ram 86 to move the knives 88 to the right, as viewed in FIG. 4, the forward sides of the envelope portions 24 are cut in the cutting zones mentioned so that the forward sides of the envelope portions 24 can be pushed forwardly and downwardly by the envelope pushing plates 80. To insure clean cuts all the way to the bottoms of the forward sides of the envelope portions 24, the knives 88 are provided with cutting points 90 at their lower ends.

Thus, with the foregoing construction, upon lowering the overhead frame 60, activating the ram 86, and then activating the ram 74, the forward sides of the envelope portions 24 are cut at their laterally spaced ends by the knives 88 and are pushed downwardly by the envelope pushing plates 80. Simultaneously with the downward flattening of the forward sides of the envelope portions 24 by the plates 80, the rows of containers 16 in the envelope portions 24 are pushed onto the conveyor belts 38 by the container pushing plates 76. As soon as all of the rows of containers 16 have been displaced onto the belt conveyors 38, the overhead frame 60 is retracted upwardly, the empty envelope 20 is removed, and the foregoing operations are repeated with the next package.

Although exemplary embodiments of the apparatus 10 and the method of the invention have been disclosed herein for illustrative purposes, it will be understood that various changes, modifications and substitutions may be incorporated therein without departing from the invention as hereinafter claimed.

I claim as my invention:

1. An apparatus for unpackaging containers from a two-portion envelope the two portions of which are hinged together, the containers being disposed in upright positions in two groups respectively within the envelope portions, including:
    a. cutting means for making a plurality of cuts thus cutting the two portions of the envelope open on a forward vertical side of the envelope in four cutting zones respectively adjacent the corners of such side and adjacent and on opposite sides of the hinge;
    b. means for displacing the groups of containers horizontally in a first direction forwardly through said forward side of the envelope; and
    c. means for restraining the envelope against forward displacement during container displacement from said envelope portions.

2. A container unpackaging apparatus according to claim 1 wherein the containers in the two groups are arranged in parallel rows, said apparatus including means for displacing successive ones of the rows of containers at right angles to said first direction to form a single file of containers composed of successive ones of said rows.

3. An apparatus according to claim 1 wherein said cutting means comprises four depending knives and means for moving said knives downwardly into said envelope portions and forwardly into said four cutting zones, respectively.

4. An apparatus as defined in claim 3 including:
    a. a main carriage movable in the fore-and-aft direction and carrying said container displacing means;
    b. an auxiliary carriage movable relative to said main carriage in the fore-and-aft direction and carrying said knives; and
    c. means for lowering said main carriage to lower said container displacing means and said knives into said envelope portions.

5. An apparatus according to claim 4 wherein said main carriage is mounted on a vertically movable frame carrying said envelope restraining means, whereby said envelope restraining means, said container displacing means and said knives are all simultaneously lowered into said envelope portions upon lowering of said frame.

6. An apparatus as set forth in claim 5 wherein said main carriage also carries means lowerable into said envelope portions for forwardly displacing said forward side of the envelope out of the path of the groups of containers.

* * * * *